United States Patent
Tran

(10) Patent No.: US 11,770,686 B2
(45) Date of Patent: Sep. 26, 2023

(54) ACCESSING CONTENT USING TIME, TOPIC, AND LOCATION TO TRANSITION BETWEEN DISPLAY MODES

(71) Applicant: PEER INC, Bellevue, WA (US)

(72) Inventor: Thinh Tran, Bellevue, WA (US)

(73) Assignee: PEER INC, Bellevue, WA (US)

(*) Notice: Subject to any disclaimer, the term of this patent is extended or adjusted under 35 U.S.C. 154(b) by 0 days.

(21) Appl. No.: 17/825,965

(22) Filed: May 26, 2022

(65) Prior Publication Data

US 2022/0386078 A1    Dec. 1, 2022

Related U.S. Application Data

(60) Provisional application No. 63/194,085, filed on May 27, 2021.

(51) Int. Cl.
| | | |
|---|---|---|
| *H04W 4/029* | (2018.01) | |
| *H04W 4/02* | (2018.01) | |
| *G01C 21/36* | (2006.01) | |
| *G01C 21/34* | (2006.01) | |

(52) U.S. Cl.
CPC ........ *H04W 4/029* (2018.02); *G01C 21/3476* (2013.01); *G01C 21/3679* (2013.01); *H04W 4/023* (2013.01); *H04W 4/026* (2013.01)

(58) Field of Classification Search
CPC ..... H04W 4/029; H04W 4/023; H04W 4/026; G01C 21/3476; G01C 21/3679
See application file for complete search history.

(56) References Cited

U.S. PATENT DOCUMENTS

| | | | | |
|---|---|---|---|---|
| 8,060,499 | B2* | 11/2011 | Mansikkaniemi | ............................ G01C 21/3682 707/724 |
| 8,589,069 | B1* | 11/2013 | Lehman | ................ H04W 4/023 340/995.14 |
| 9,146,129 | B1* | 9/2015 | Furio | ................. G01C 21/3679 |
| 10,914,597 | B2* | 2/2021 | Kamata | .............. G06Q 30/0202 |
| 2005/0187707 | A1* | 8/2005 | Yokota | ............... G01C 21/3476 701/410 |

(Continued)

FOREIGN PATENT DOCUMENTS

JP    4300767 B2 *   7/2009   ............. G01C 21/00

OTHER PUBLICATIONS

International Search Report and Written Opinion for PCT Application No. PCT/US2022/31180, dated Aug. 15, 2022, 10 pages.

*Primary Examiner* — Matthew C Sams

(74) *Attorney, Agent, or Firm* — Seed IP Law Group LLP

(57) ABSTRACT

A computing system for presenting on a mobile device pieces of content each connected to a geographic location is described. The facility plots visual indications of the pieces of content in a two-dimensional display with respect to an origin point representing a user geographic location. In particular, for each piece of content, the facility plots a visual indication at a point that is (1) in a direction from the origin point that corresponds to a compass direction from the user geographic location to the geographic location to which the piece of content is connected, and (2) at a distance from the origin point that corresponds to a predicted amount of time to travel from the user geographic location to the geographical location to which the piece of content is connected.

21 Claims, 10 Drawing Sheets

(56) References Cited

U.S. PATENT DOCUMENTS

| | | | |
|---|---|---|---|
| 2007/0281689 A1* | 12/2007 | Altman | H04L 51/222 |
| | | | 455/435.1 |
| 2008/0091689 A1* | 4/2008 | Mansikkaniemi | |
| | | | G01C 21/3682 |
| 2008/0249983 A1* | 10/2008 | Meisels | G01C 21/3476 |
| 2009/0216732 A1* | 8/2009 | Feng | G01C 21/3679 |
| 2015/0106006 A1* | 4/2015 | Najafi | G01C 21/343 |
| | | | 701/400 |
| 2015/0254277 A1* | 9/2015 | Campbell | G06Q 30/0259 |
| | | | 715/771 |
| 2016/0169695 A1* | 6/2016 | Hall | G06Q 30/0261 |
| | | | 701/426 |
| 2016/0358021 A1* | 12/2016 | Hong | G01C 21/34 |
| 2017/0038218 A1* | 2/2017 | Kamata | G06Q 30/0202 |
| 2017/0146361 A1* | 5/2017 | Lucas | G01S 19/42 |
| 2017/0230792 A1* | 8/2017 | Shaik | H04W 4/022 |
| 2018/0135992 A1* | 5/2018 | Kamata | G06Q 30/0202 |
| 2019/0278776 A1 | 9/2019 | Villafane | |
| 2021/0140788 A1* | 5/2021 | Muro, II | G01C 21/3673 |

\* cited by examiner

ACCESSING CONTENT USING TIME, TOPIC, AND LOCATION TO TRANSITION BETWEEN DISPLAY MODES

BACKGROUND

Computer networks and programs that exchange data through them provide opportunities to share content among people, such as photos or audio or video sequences, reviews of establishments or products or works of art, commentary, restaurant menus, etc. Some such pieces of content are related to, connected to, or associated with, a geographic location. For example, when many devices capture a photo or video chip, they attach the geographic location where the photo was taken to the photo in metadata. Similarly, reviews, ratings, and menus for a restaurant relate to the restaurant's geographic location.

Map applications designed for mobile devices display a map. Some of these map applications display at locations on the map visual indications of content that relates to these locations. A user can touch such a visual indication to view content related to its location. For example, the map application might display a knife-and-fork icon at the location of a restaurant. When the user touches the icon, the map application can display photos, a menu, or reviews for the restaurant.

In some cases, the map application displays a visual indication of the user at the mobile device's present location, and scrolls the map to keep this visual indication on the screen as the mobile device's location changes, such as when the user carries the mobile device while walking or riding in a car, on a bus or a train, etc.

DETAILED DESCRIPTION

Figure 1:
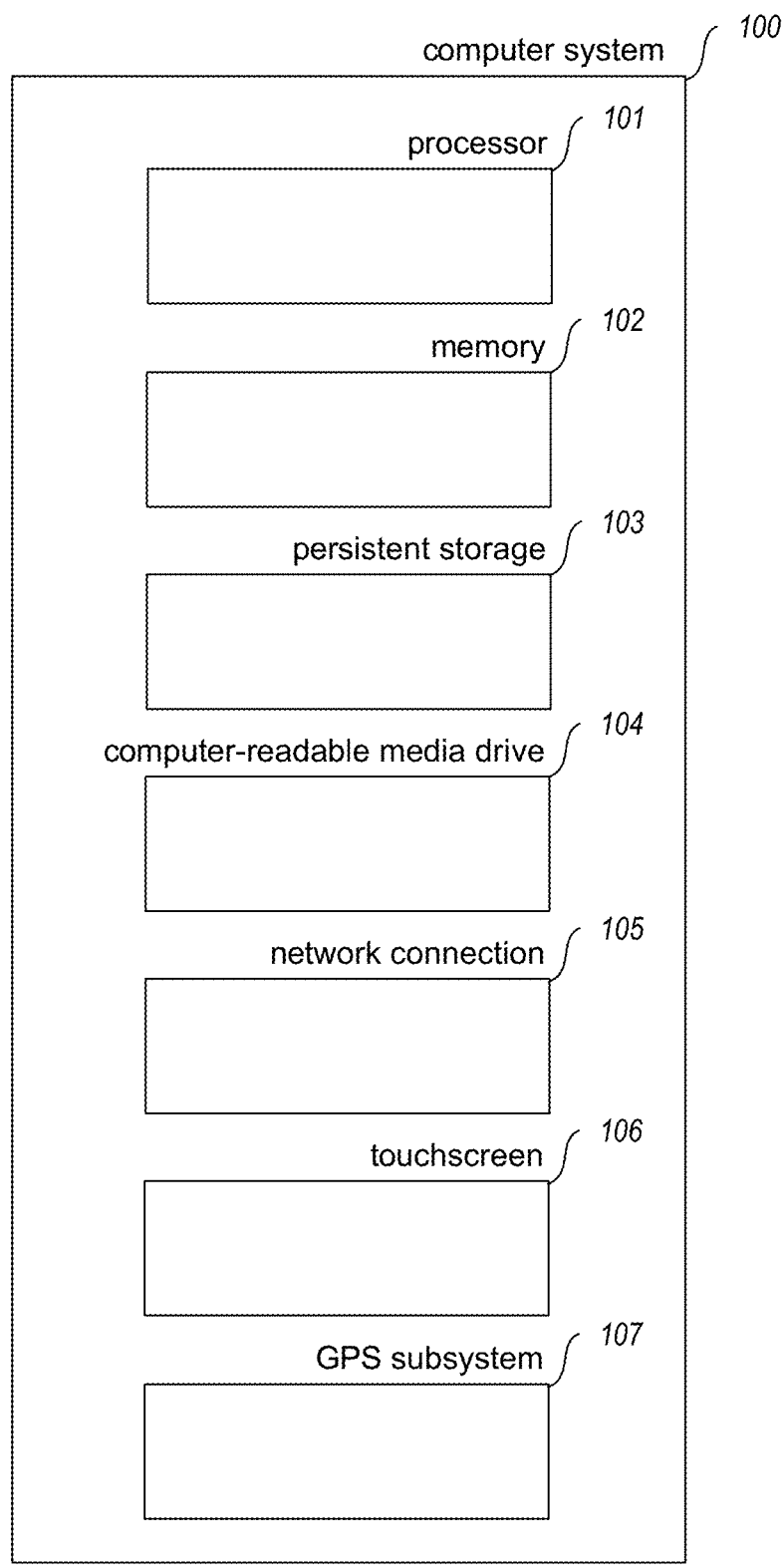
FIG. 1 is a block diagram showing some of the components typically incorporated in at least some of the computer systems and other devices on which the facility operates.

Conventional systems for presenting location-related content may have many disadvantages. For example, it can be difficult to assess content plotted on a map in terms of what times different pieces of content relate to, or how much time it will take to reach the locations to which particular pieces of content relate, or how popular different pieces of content—or establishments or points of interest of other types with which they are associated—are.

To overcome these disadvantages of conventional approaches to presenting location-related content, embodiments described herein relate to a software or hardware, or software and hardware, system or facility for presenting location-related content in helpful ways. This software, or hardware, or combined system may be collectively referred to as "the facility."

In some embodiments, the facility presents location-related content based on factors that include travel time from the user's location. In various embodiments, this user location can be an actual user location where the user and their portable device are presently located, or a virtual user location chosen by or on behalf of the user. In various embodiments, the user can establish a virtual user location by clicking on or near a location or point of interest in any of the facility's displays, dragging a displayed visual indication of the user's location to a different location, selecting a past time to select the user's actual location at that time, searching for a location, etc.

In some embodiments, the facility presents a two-dimensional quasi-spatial display in which the facility plots locations associated with content (1) in the compass direction in which the location lies relative to a user location, and (2) at a display distance that is based on the user's predicted travel time to the location, as contrasted with being based on the distance between the user location and the plotted location. For example, if, because of non-uniform traffic, the user is predicted to be able to travel to a location 9 miles to the East at a speed three times as great as to a location 6 miles to the North, the facility will show the location to the North at a display distance twice as great as the display distance to the location to the East, rather than ⅔ as great.

In some embodiments, the user can transition between the facility's two-dimensional quasi-spatial display and a one-dimension scroll list of locations. In various embodiments, the facility orders the scroll list of locations based on factors such as estimated travel time from user location, distance from the user's location, direction of each location from user location compared to direction of user travel, popularity of each location or associated content, etc. In some embodiments, by scrolling this scroll list to a particular point, the user can set a virtual user location that affects the display both of the scroll list and the quasi-spatial display.

In some embodiments, the facility enables the user to control an effective time or effective time range that affects which locations are shown by the facility.

In various embodiments, the user does so by swiping the quasi-spatial display left for earlier and right for later, or accessing a specialized user interface to specify a date or time, or a range of dates or times. The facility uses the effective time established by the user to filter the locations shown in any of the facility's displays, such as by showing only locations having content whose time intersects or nearly intersects with the effective time or effective time range established by the user.

In some embodiments, the facility enables the user to control a topic that affects which locations are shown by the facility. In various embodiments, the user does so by selecting a topic from a hierarchical menu displayed by the facility, typing a hashtag or other textual query associated with the desired topic, selection of a "more of these" control displayed by the facility together with a point of interest or content that matches a particular topic, etc. The facility uses the topic established by the user to filter the location shown in any of the facility's displays, such as by showing only locations having content categorized by that topic or mentioning that topic, or content that bears a certain level of similarity or connection to that topic.

By performing in some or all of the ways discussed above, the facility enables a user to access location-related content in ways that are natural and helpful, both for users who are exploring a particular geographic region in person, and those who are exploring a geographic region remotely, such as in preparation for a visit.

Also, the facility improves the functioning of computer or other hardware, such as by reducing the dynamic display area, processing, storage, or data transmission resources needed to perform a certain task, or some combination thereof, thereby enabling the task to be permitted by less capable, capacious, or expensive hardware devices, or be performed with less latency, or preserving more of the conserved resources for use in performing other tasks or additional instances of the same task. For example, the facility conserves processing resources that would otherwise be allocated to users reviewing information for locations that would take so long to travel to that doing so is not practical. As a result, a cheaper, less powerful portable device can be substituted to achieve the same level of performance, or the same portable device can be used with excess processing capacity remaining for performing additional desirable tasks.

FIG. 1 is a block diagram showing some of the components typically incorporated in at least some of the computer systems and other devices on which the facility operates. In various embodiments, these computer systems and other devices 100 can include server computer systems, cloud computing platforms or virtual machines in other configurations, desktop computer systems, laptop computer systems, netbooks, mobile phones, personal digital assistants, televisions, cameras, automobile computers, electronic media players, etc.

In various embodiments, the computer systems and devices include one or more of each of the following:
- a processor 101 for executing computer programs or training or applying machine learning models, such as a CPU, GPU, TPU, NNP, FPGA, or ASIC;
- a computer memory 102 for storing programs and data while they are being used, including the facility and associated data, an operating system including a kernel, and device drivers;
- a persistent storage device 103, such as a hard drive or flash drive for persistently storing programs and data;
- a computer-readable media drive 104, such as a floppy, CD-ROM, or DVD drive, for reading programs and data stored on a computer-readable medium;
- a wired or wireless network connection 105 for connecting the computer system to other computer systems to send or receive data, such as via the Internet or another network and its networking hardware, such as switches, routers, repeaters, electrical cables and optical fibers, light emitters and receivers, radio transmitters and receivers, and the like;
- a built-in display, such as a touchscreen 106 that can display visual information and receive taps and other touch interactions at particular locations;
- and a GPS subsystem 107 or other mechanism for determining the geographic location of the computer system.

Figure 2:
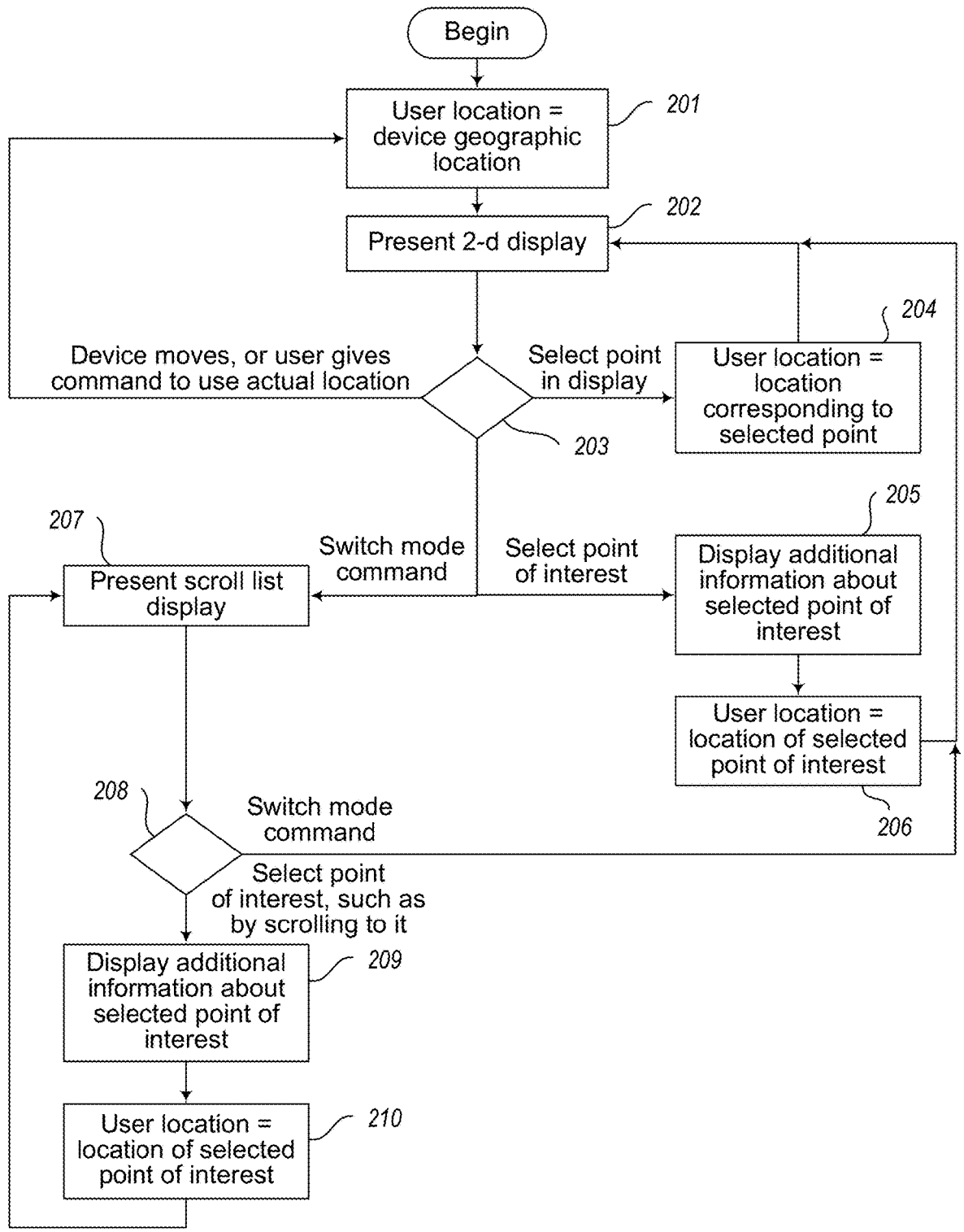
FIG. 2 is a flow diagram showing a process performed by the facility in some embodiments to operate the user interface it provides.
Figure 3:
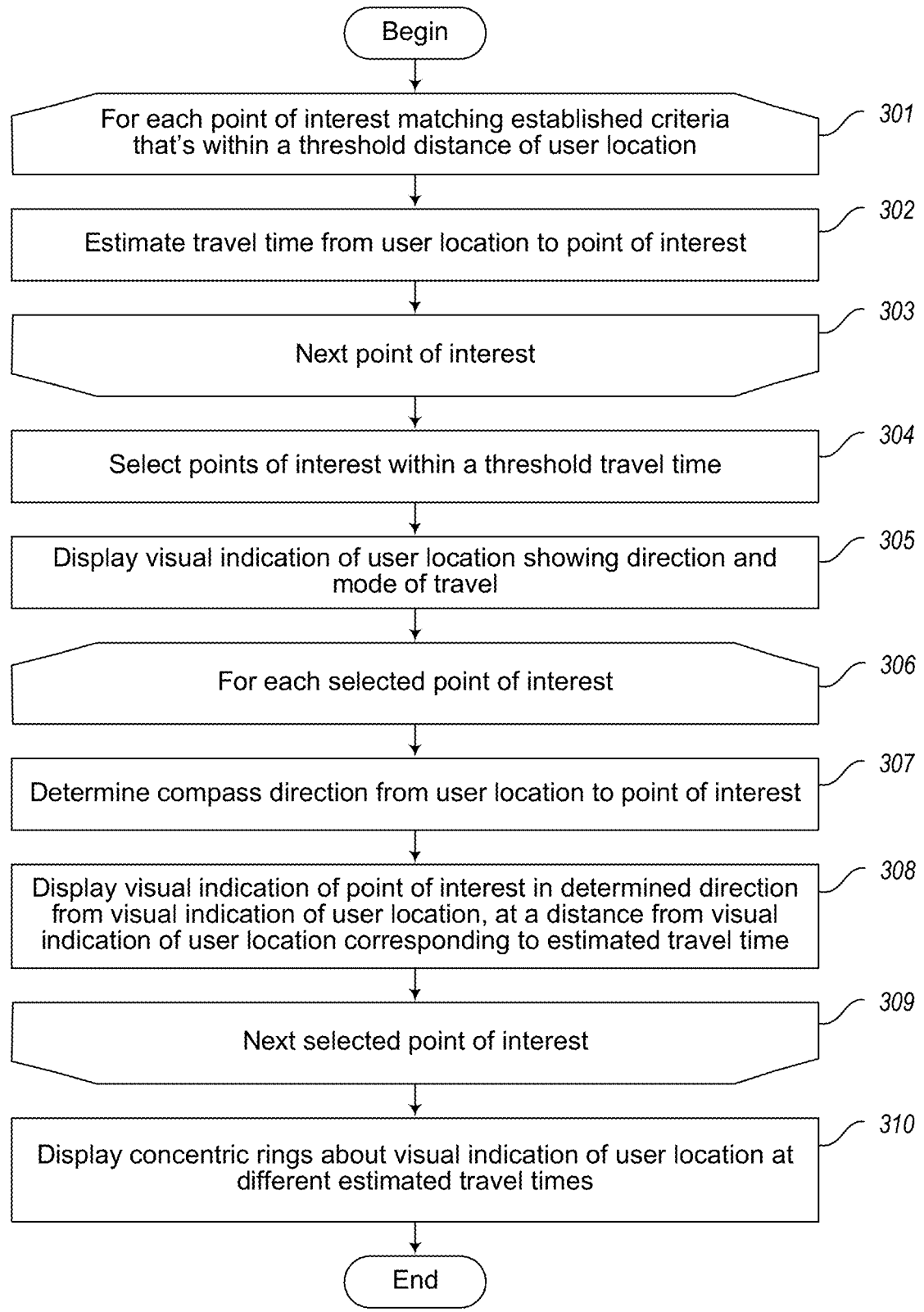
FIG. 3 is a flow diagram showing a process performed by the facility in some embodiments to present a two-dimensional quasi-spatial display mode.
Figure 8:
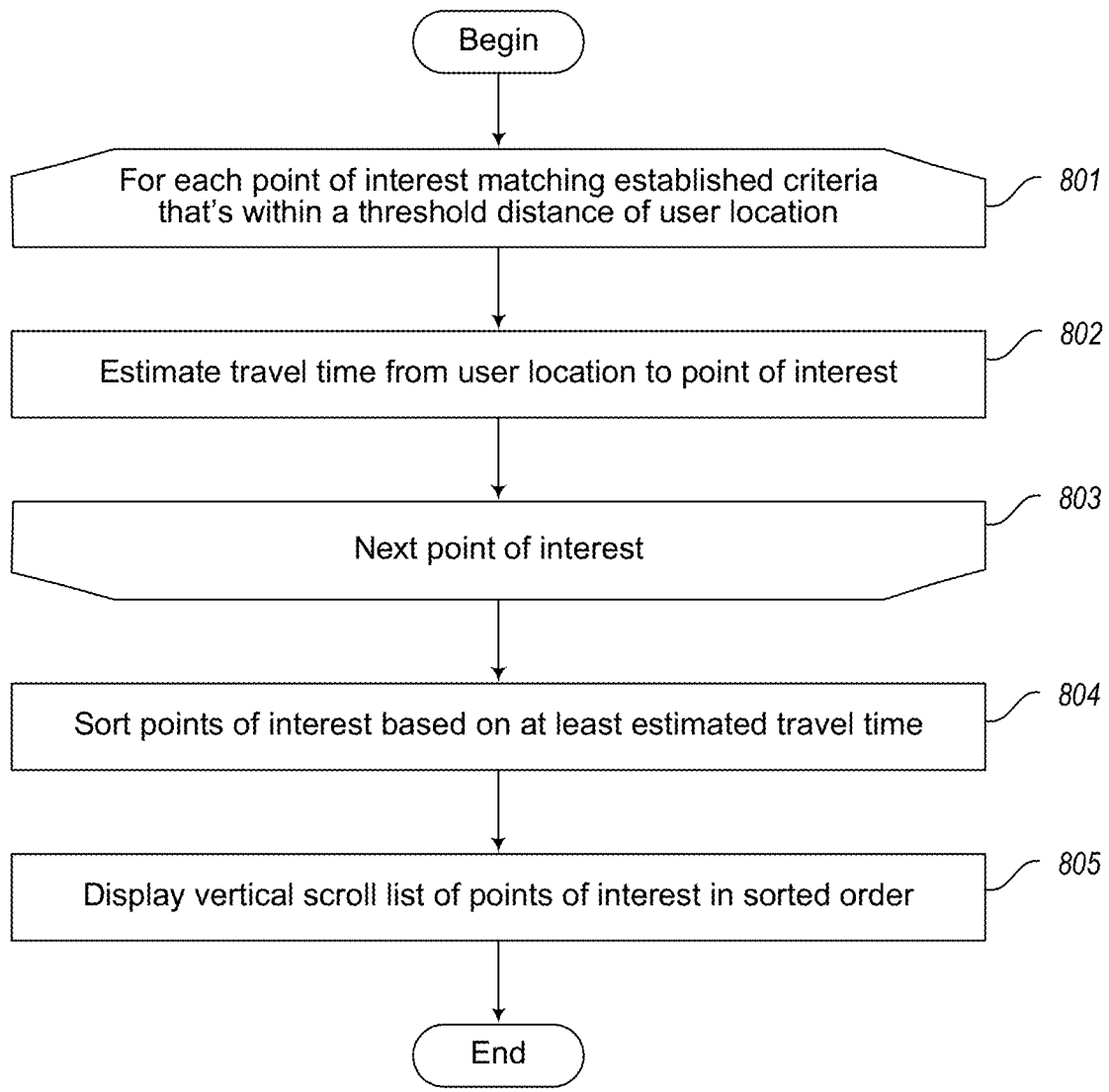
FIG. 8 is a flow diagram showing a process performed by the facility in some embodiments to present its scroll list display mode.

The process as shown in FIGS. 2, 3, and 8 discussed below can be performed by the computer systems shown in FIG. 1.

While computer systems configured as described above are typically used to support the operation of the facility, the facility may be implemented using devices of various types and configurations, and having various components.

FIG. 2 is a flow diagram showing a process performed by the facility in some embodiments to operate the user interface it provides. In act 201, the facility initializes a user location variable by setting it equal to the geographic location of the device, such as a geographic location determined for the device by its GPS subsystem. In act 202, the facility presents a two-dimensional quasi-spatial display in which points of interest are shown at distances that correspond to predicted travel times from the user location specified by the user location variable. The facility's performance of step 202 is discussed below in connection with FIG. 3.

FIG. 3 is a flow diagram showing a process performed by the facility in some embodiments to present a two-dimensional quasi-spatial display mode. In acts 301-303, the facility loops through each point of interest that matches the established criteria that is within a threshold distance of the user location, that are within the same geographic or governmental region as the user location, etc. In various embodiments, criteria of various types are explicitly or implicitly specified by the user such as point of interest type, category, or topic; types or topics of content available for points of interest; effective dates of content connected to a point of interest; hierarchical, tag-based, or other kinds of subject matter categories; whether the point of interest is currently open for business or otherwise accessible, etc. In some embodiments, act 302 involves (1) determining a preset or recent travel speed, mode of travel, or both of the mobile device and user; (2) determining a shortest or most direct route from the user location to the point of interest; (3) using speed limit, traffic condition, actual measured speeds for relevant modes of transportation, accidents, etc., for the segments making up the determined route to determine a predicted travel time for each of them; and (4) accumulating an estimated travel time based upon the projected speed in each segment. In act 302, the facility estimates a travel time from the current user location to the point of interest. In act 303, if additional points of interest remain to be processed, then the facility continues in act 301 to process the next point of interest, else the facility continues in act 304.

In act 304, the facility selects points of interest whose estimated travel times are no greater than a threshold travel time, such as five minutes, 10 minutes, 15, 20 minutes, 30 minutes, 45 minutes, 60 minutes, 90 minutes, two hours, four hours, eight hours, etc. In various embodiments (not shown), the facility selects a set of points of interest on a variety of other bases, including selecting up to a maximum number of points of interest based upon a score that considers distance, travel time, popularity, estimated interest level of the user, etc. In act 305, the facility displays a visual indication of the user location that shows any direction in which the user can be discerned to be traveling or facing, as well as a mode of travel. In various embodiments, the facility infers mode of travel based on speed; patterns in speed over time; amplitude or frequency of movement perpendicular to the direction of travel, such as those identified using inertial or velocity sensors in the mobile device; etc. In various embodiments, the facility infers direction of travel based upon the most recent changes in location of the mobile device; accelerometer output; orientation of mobile device; orientation of additional devices carried by or attached to the user, such as a smartwatch; etc.

In acts 306-309, the facility loops through each point of interest selected in act 304. In act 307, the facility determines a compass direction of a direct path from the user location to the geographic location of the point of interest. In various embodiments, the facility determines the geographic location of the point of interest based upon latitude and longitude or other location metadata of content connected to the point of interest; a street address specified for the point of interest; location information generated by a different mobile device at a time that the mobile device's user reported being at the point of interest; etc. In act 308, the facility displays a visual indication of the point of interest relative to the visual indication of the user location displayed in act 305, where the visual indication of the point of interest is positioned (a) in the compass direction determined in act 307, and (b) at a distance that corresponds to the travel time estimated for the point of interest in act 302. In act 309, if additional selected points of interest remain to be processed, then the facility continues at act 306 to process the next selected point of interest, else the facility continues in act 310. In act 310, the facility displays concentric rings that have the visual indication of the user location at their center, whose radii correspond to different estimated travel times. In various embodiments, the facility displays rings whose radii are retrieved from a predetermined list; determined dynamically based upon factors that include display size, resolution, or density, estimated travel speed or mode of travel, estimated amount of time available in the user's schedule, density or number of points of interest displayed, proximity of points of interest to different possible radii, etc. In some embodiments, the facility marks each concentric ring with the estimated travel time to which it corresponds. After act 310, this process concludes.

The acts shown in FIG. 3 and in each of the other flow diagrams discussed herein may be altered in a variety of ways, while still employing embodiments described herein. For example, the order of the acts may be rearranged; some acts may be performed in parallel; shown acts may be omitted, or other acts may be included; a shown act may be divided into sub-acts, or multiple shown acts may be combined into a single act, etc.

Figure 4:
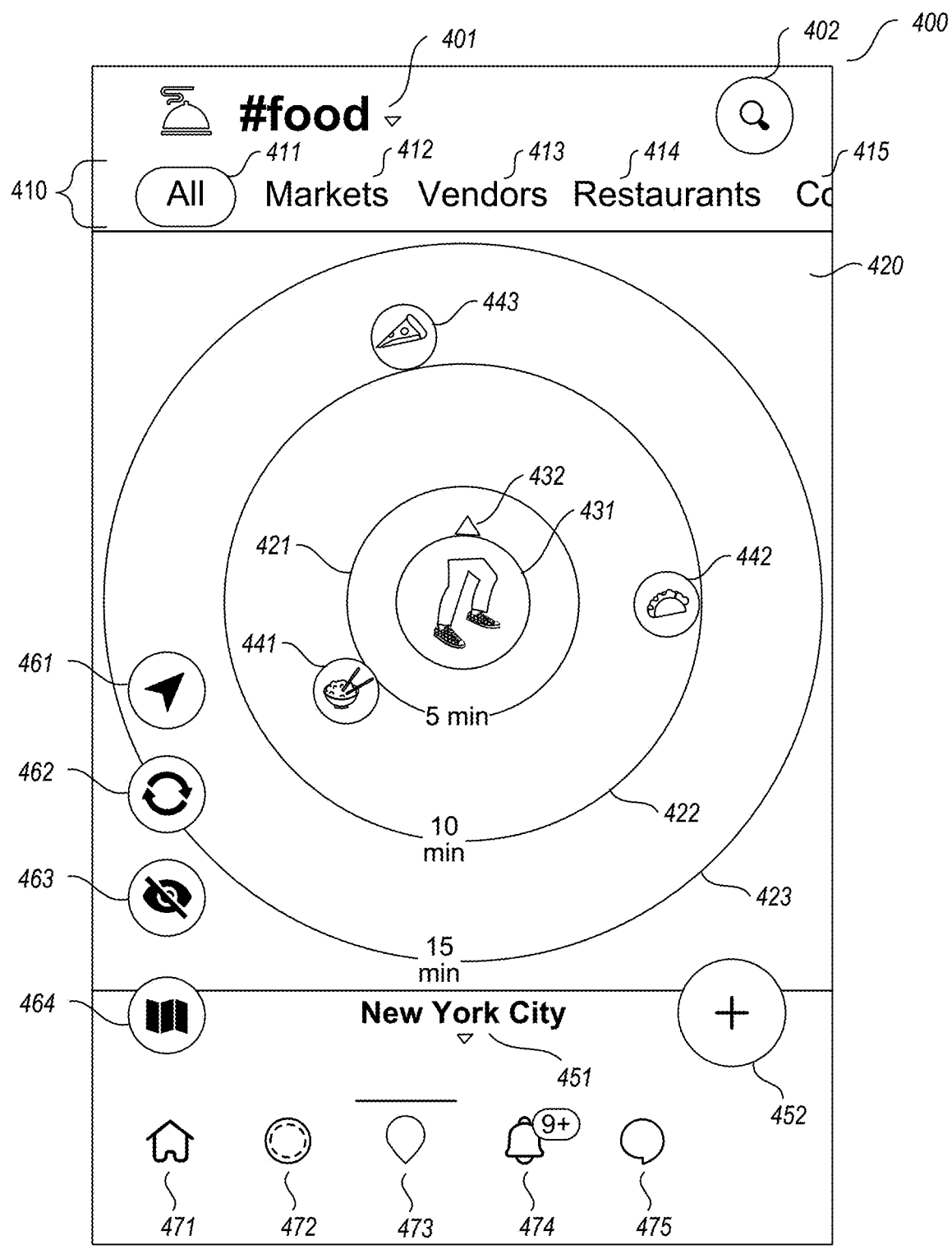
FIG. 4 is a display diagram showing a sample display presented by the facility in some embodiments in its two-dimensional display mode.

FIG. 4 is a display diagram showing a sample display presented by the facility in some embodiments in its two-dimensional display mode, such as is generated by the process described in FIG. 3. The display 400 includes controls for setting criteria according to which points of interest are displayed. For example, the user can use control 401 to set a hashtag topic to which displayed points of interest or their content should relate. The user can activate control 402 in order to search for categories that can be used to set topic criteria. The user can access hierarchical menu 410, in which the user can select all types of establishments 411 or particular types of establishments 412-415.

The display also includes a quasi-spatial portion 420 in which visual indications of the user and points of interest are shown. In the center of the quasi-spatial portion 420 is a visual indication 431 of the user, here with an image that indicates that the facility has inferred that the user is walking, accompanied by a directional indicator 432 that indicates that the facility has inferred that the user is walking toward the top of the display, which in some embodiments is in the north compass direction.

The facility displays rings 421, 422, and 423 around the user location indication 431. Each ring has the user's location 431 as its center, and identifies a different distance from the user location visual indication 431 that corresponds to a particular predicted travel time. For example, the facility predicts that points of interest on or near ring 421 will take five minutes to reach; points of interest on or near ring 422 will take 10 minutes to reach; etc. In some embodiment (not shown), the facility displays these rings at irregular intervals. In some such embodiments, the facility displays one ring near each cluster of at least a threshold number of displayed points of interest having similar predicted travel times. For example, in a two-dimensional display in which the facility displays eight points of interest with predicted travel times of six minutes, eight minutes, nine minutes, 22 minutes, 23 minutes, 25 minutes, 27, minutes, and 28 minutes, in some embodiments the facility displays a first ring having an eight minute radius, and a second ring having a 25 minute radius.

Also plotted are visual indications 441-443, each corresponding to a different point of interest. As one example, visual indication 441 is shown for a restaurant called Annie's Rice Bowls. The positioning of the visual indication 441 in the quasi-spatial portion 420 shows that this restaurant is behind the user to the left, and could be reached by the user in approximately six minutes. In some embodiments, the facility displays inside each point of interest visual indication a preview of content associated with the point of interest, such as an image, a video, an animation clip, etc. For example, visual indication 441 shows a preview of a rice bowl image that is associated with the point of interest. The display also includes a variety of other controls. The user can use control 451 to select a different geographic area to display, or the user can use control 452 in order to access additional functionality. The user can activate control 461 in order to switch the display mode to the scroll list display mode. In some embodiments, the facility permits the user to use a gesture, such as swiping in a particular direction, to switch display modes. The user can activate control 462 in order to change from displaying based upon a virtual user location to displaying based upon the actual user location. The user can activate control 463 to toggle the type of information shown in the quasi-spatial portion 420, or activate control 464 in order to view a map. Additionally, the user can activate control 471 in order to access a home or default menu, control 472 in order to select one or more visual indicators to see additional information about those associated points of interest, control 473 in order to set a pin or location identifier, control 474 in order to view alerts (e.g., menu changes or hours of operation) regarding the points of interests associated with the visual indications 441-443, or control 475 in order to view other users posts or reviews regarding the points of interest associated with the visual indications 441-443.

While FIG. 4 and each of the display diagrams discussed below show a display whose formatting, organization, informational density, etc., is best suited to certain types of display devices, actual displays presented by the facility may differ from those shown, in that they may be optimized for particular other display devices, or have shown visual elements omitted, visual elements not shown included, visual elements reorganized, reformatted, revisualized, or shown at different levels of magnification, etc.

Returning to FIG. 2, in act 203, the facility branches based upon events that occur. If the facility determines that the device has moved, or the user gives a command to use the user's actual location as contrasted with virtual location—such as by activating control 461—then the facility continues in act 201 to set the current user location to be equal to the current geographic location of the device. This branch is discussed below in connection with FIGS. 5 and 6.

Figure 5:
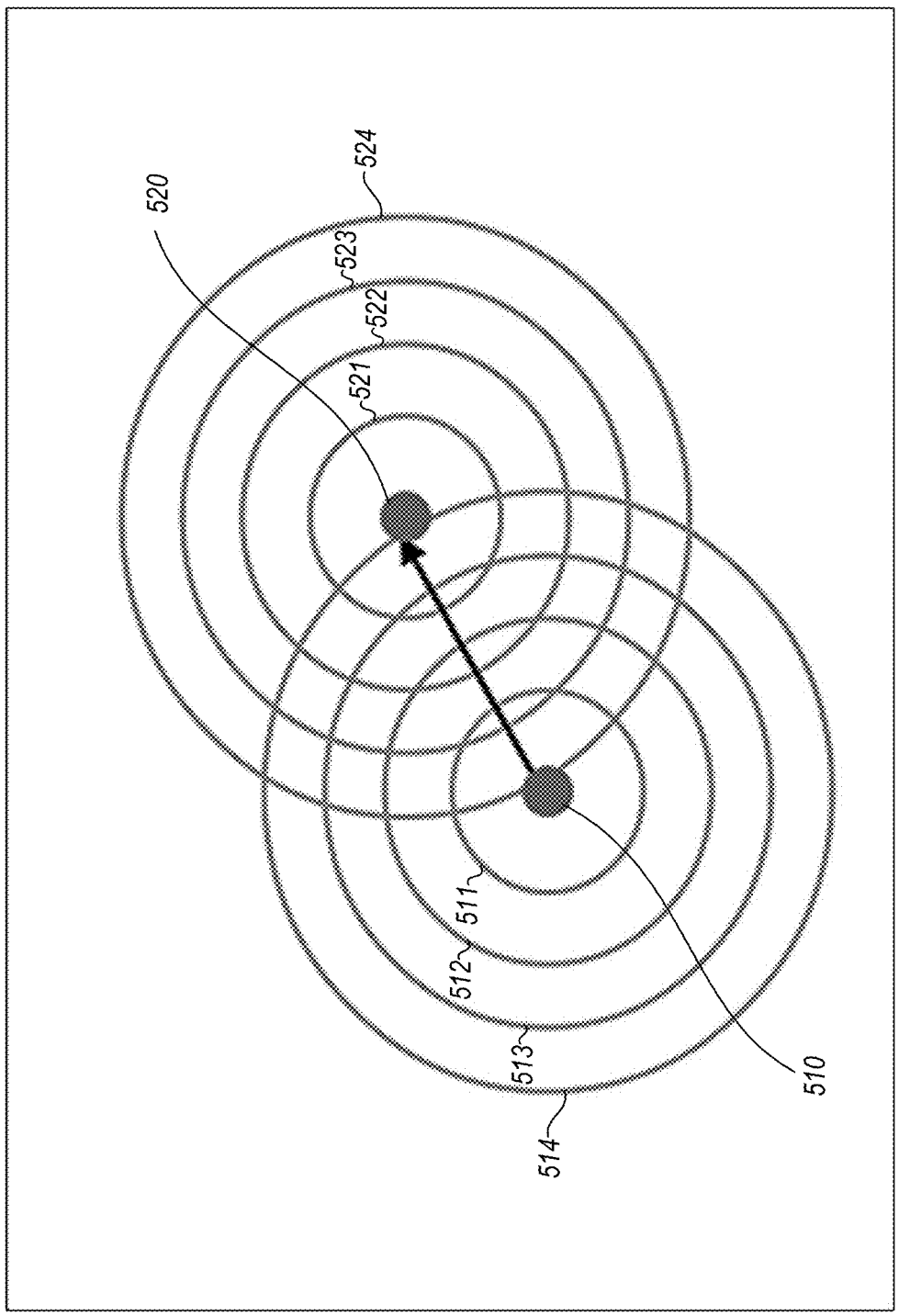
FIG. 5 is a display shift diagram showing the facility's response to the mobile device moving, or the user giving a command to use the user's actual location.

FIG. 5 is a display shift diagram showing the facility's response to the mobile device moving, or the user giving a command to use the user's actual location. The diagram shows initial user location 510 surrounded by rings 511-514. When act 203 in FIG. 2 is re-executed, the display shifts such that the final user location visual indication 520 matches the current device geographic location, and final rings 521-524 surround the new user location visual indication 520. In some embodiments, the facility shifts the user location visual indication to a new position on the display. In these embodiments, the point of interest visual indications remain in the same display positions or shift to new display positions as necessary in order to establish the proper relationship between their display positions and that of the user location visual indication. In some embodiments, the facility does not move the user location visual indication. In these embodiments, the facility shifts the display locations of the point of interest visual indications to be in proper relation to the display location of the user location visual indication. This is shown in FIG. 6 and described below.

Figure 6:
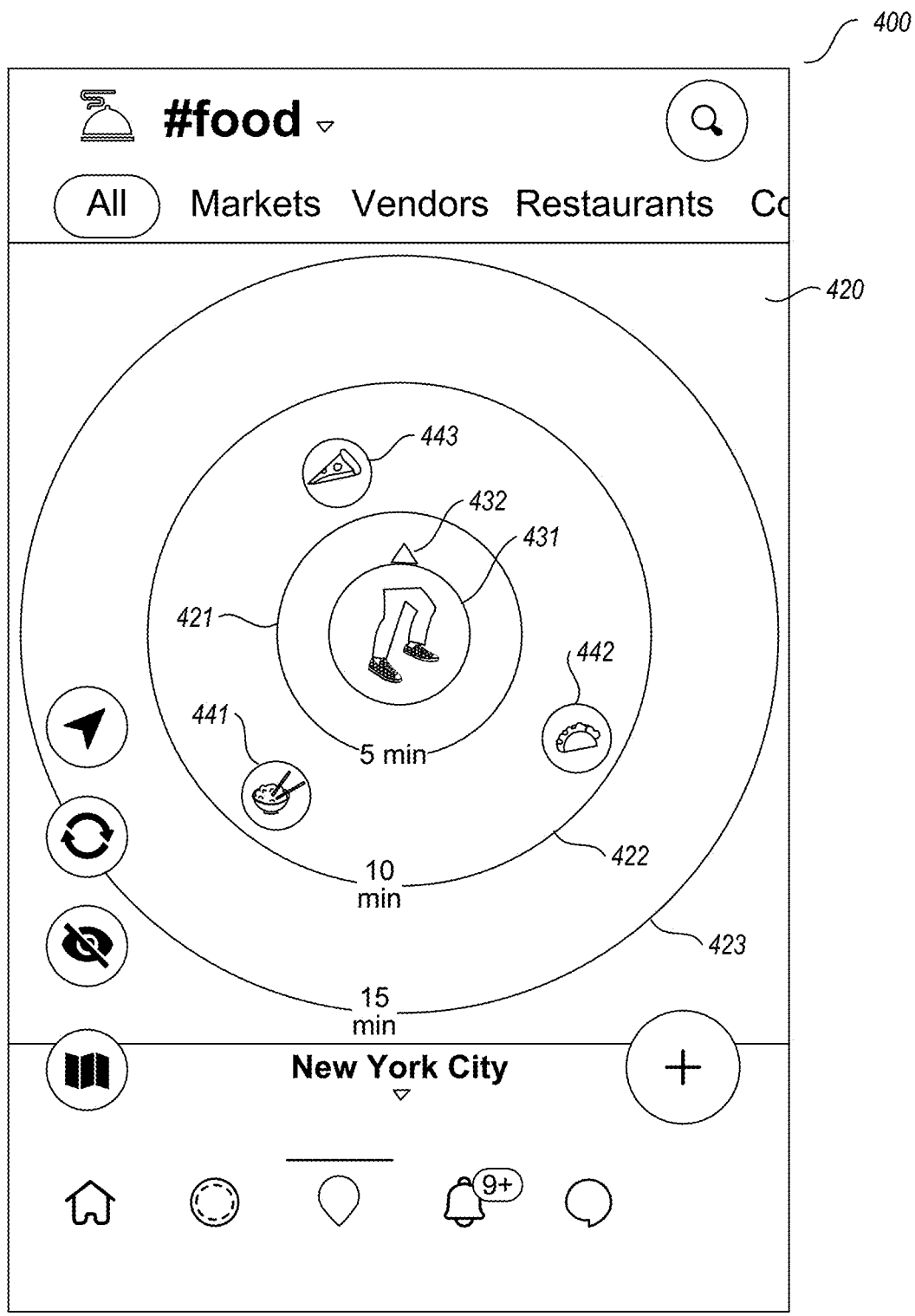
FIG. 6 is a display diagram showing a subsequent sample display showing the quasi-spatial display after the user has moved in an upward direction to a new actual geographic location.

FIG. 6 is a display diagram showing a subsequent sample display showing the quasi-spatial display after the user has moved in an upward direction to a new actual geographic location. It can be seen that, relative to stationary user location visual indication 431, point of interest visual indications 441-443 have all moved toward the bottom of quasi-spatial area 420 of screen 400 to reflect their new directions and estimated travel times relative to the user's new user location.

Returning to FIG. 2, in act 203, if the user selects a point in the display, then the facility continues in act 204. In act 204, the facility sets the user location to match a geographic location corresponding to the point selected on the display. After act 204, the facility continues in act 202 to present a new version of the present display that reflects the virtual user location selected by the user.

In act 203, if the user selects a visual indication of a point of interest on the point of display, the facility continues in act 205. In act 205, the facility displays additional information about the selected point of interest, such as its name, address, contact information, rating, reviews, photographs, videos, audio clips, emoticons, hours, other associated content, etc. In act 206, the facility sets the current location to be equal to the geographical location of the point of interest selected in act 205. After act 206, the facility continues in act 202 to present a new version of the present display reflecting the new virtual location selected by the user.

In act 203, if the user issues a switch display mode command, then the facility continues in act 207. In act 207, the facility presents its scroll list display. The facility performance of act 207 is discussed below in connection with FIGS. 7-10.

Figure 7:
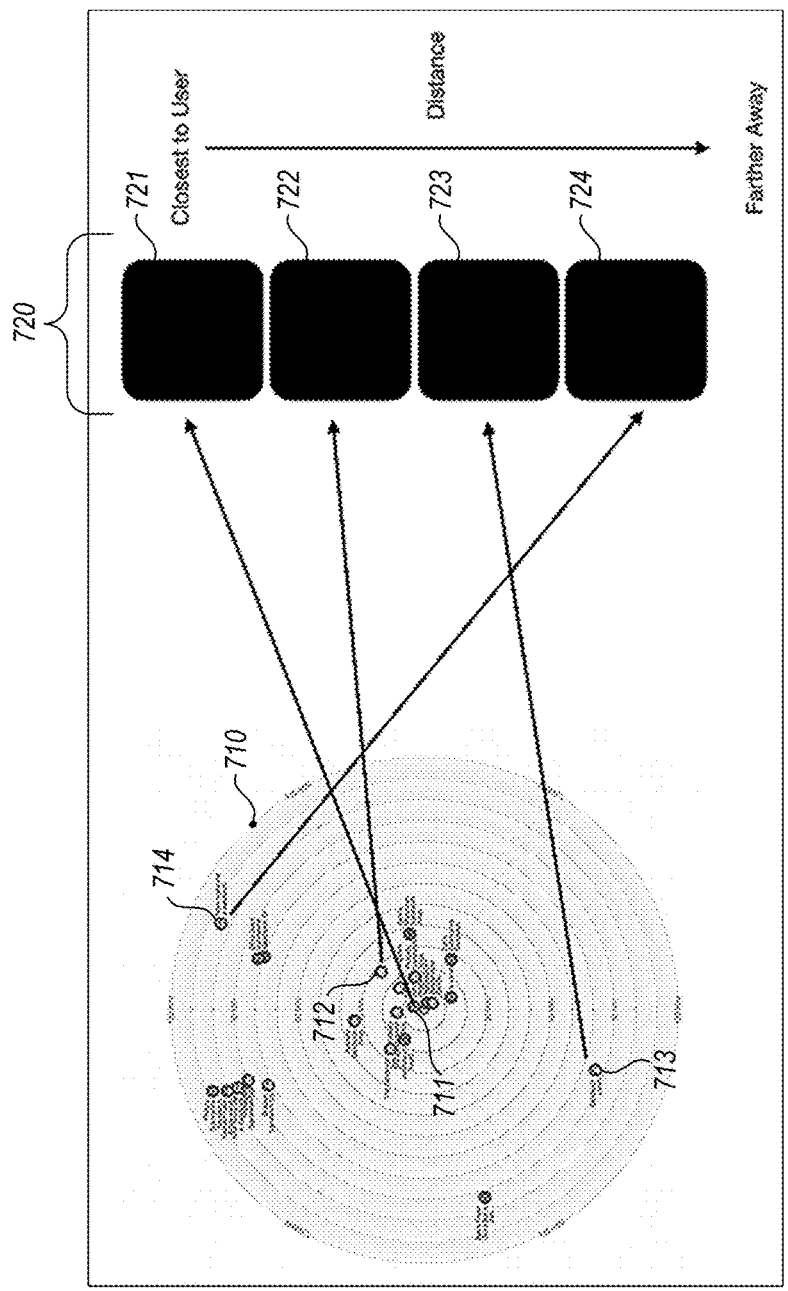
FIG. 7 is a transition diagram depicting the facility's transformation of its two-dimensional display mode to its vertical scroll list display mode.

FIG. 7 is a transition diagram depicting the facility's transformation of its two-dimensional display mode to its vertical scroll list display mode. The diagram shows two-dimensional display 710, which contains point of interest visual indications that include visual indications 711-714. The diagram also shows a vertical scroll list 720 constructed by the facility based upon the two-dimensional display. In particular, the scroll list has entries each corresponding to one of the points of interest shown on the two-dimensional display. In general, the facility orders these scroll list items so that those closest to the user—such as having the smallest estimated travel time from the user—are nearer the top, and those farther away from the user—such as those having a larger estimated travel time from the user—are toward the bottom. For example, the point of interest 711 corresponding to list element 721 is near the user location indication in the display, and thus has a small estimated travel from this geographic location, so the facility positions it quasi-spatial display at the top of the scroll list. As entries progress down the scroll list, they are generally further from the user location visual indication in the two-dimensional, and therefore greater estimated travel times from the user location. In various embodiments, the facility uses one or more of a variety of other factors to order point of interest elements in the scroll list, such as a degree to which a user is travel toward each point of interest, or a level of popularity attributed to each point of interest.

FIG. 8 is a flow diagram showing a process performed by the facility in some embodiments to present its scroll list display mode. In acts 801-803, the facility loops through each point of interest that matches an established criteria and is within a threshold distance of the user location. In various embodiments, criteria of various types are explicitly or implicitly specified by the user such as point of interest type, types of content available for points of interest, effective dates of content connected to a point of interest, hierarchical, tag-based, or other kinds of subject matter categories, whether the point of interest is currently open for business or otherwise accessible, etc.

In act 802, the facility estimates a travel time from the current user location to the point of interest. In act 803, if additional points of interest remain to be processed, then the facility continues in act 801 to process the next point of interest, else the facility continues in act 804. In act 804, the facility sorts the matching points of interest based on estimated travel time, and, in various embodiments, a degree to which the user is traveling toward the point of interest's geographic location or a level of popularity attributed to each geographic location or content associated with it. In act 805, the facility displays a vertical scroll list of the matching points of interest in the sorted order generated in act 804. After act 805, this process concludes.

Figure 9:
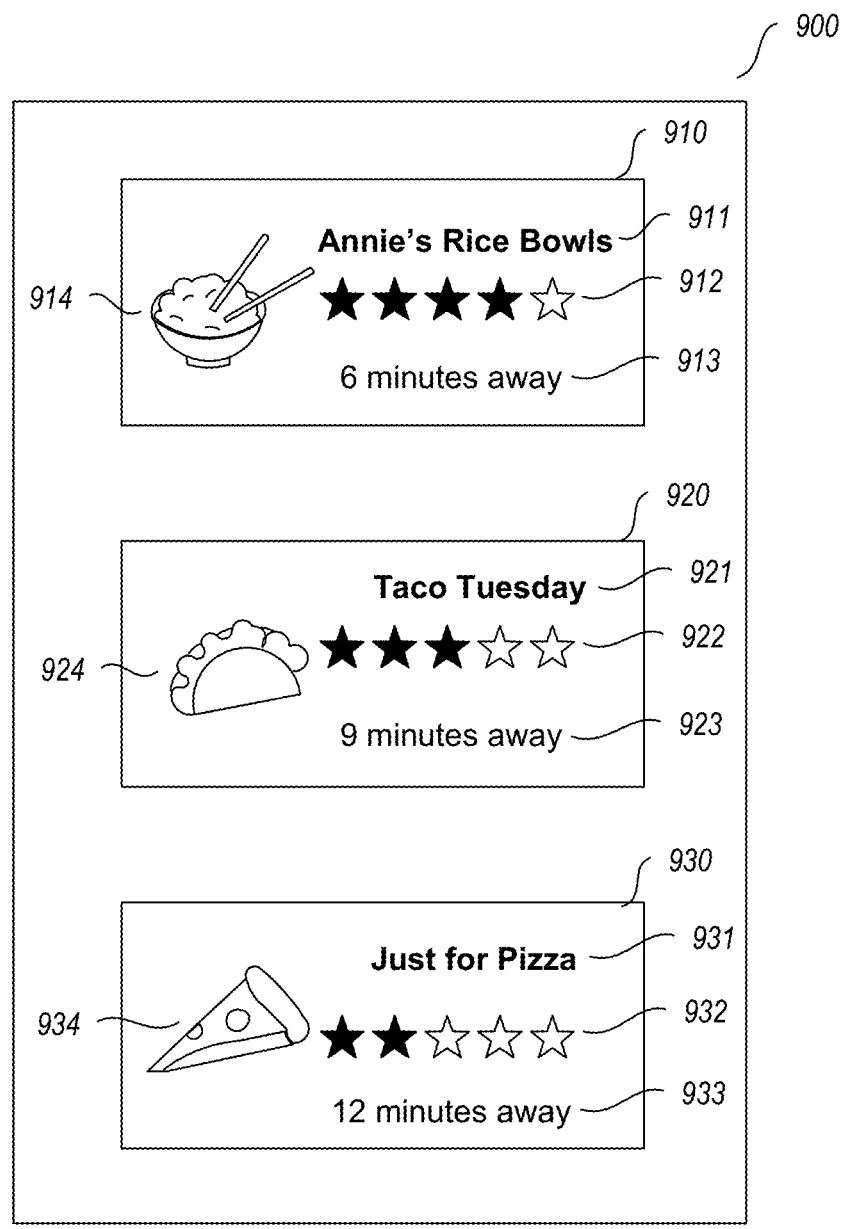
FIG. 9 is display diagram showing a display presented by the facility in some embodiments to present the facility's vertical scroll list display mode.

FIG. 9 is display diagram showing a display presented by the facility in some embodiments to present the facility's vertical scroll list display mode. The display 900 includes a vertically-oriented list of elements 910, 920, and 930, each corresponding a different point of interest whose visual indication is shown on the two-dimensional display 420 shown in FIG. 4. For example, element 910 corresponds to point of interest visual indication 441. This entry in the list contains a name 911 for the point of interest; a crowd or editorial rating 912 for the point of interest; an indication 913 of the estimated amount of time it would take for the user to reach the point of interest from the present user location; and image content 914 that relates to this point of interest. The user can scroll the display upward and downward—such as by using upward and downward swipe gestures—to display additional elements in the list, in this case those that are a greater estimated travel time from the user location, or otherwise lower in the list.

Returning to FIG. 2, after act 207, in act 208, the facility branches on certain possible events. In act 208, if the user issues a switch mode command, then the facility continues in act 202 to show a new version of its two-dimensional display. In some embodiments, the new version of the two-dimensional display presented in act 202 reflects a virtual user location corresponding to the geographic location of the point of interest whose scroll list entry was scrolled to the top of the scroll list at the time the switch mode command was issued. In act 208, if the user selects one of the entries in the scroll list corresponding to a particular point of interest—such as by touching the entry, or scrolling the scroll list to a point at which the entry is at the displayed portion of the scroll list—then the facility continues in act 209. In act 209, the facility displays additional information about the selected point of interest, such as various content associated with the selected point of interest. In act 210, the facility sets the current user location to be equal to the geographic location of the point of interest whose entry was selected in act 209. After act 210, the facility continues in act 207 to generate a new version of the scroll list display that reflects the current user location established in act 210.

Figure 10:
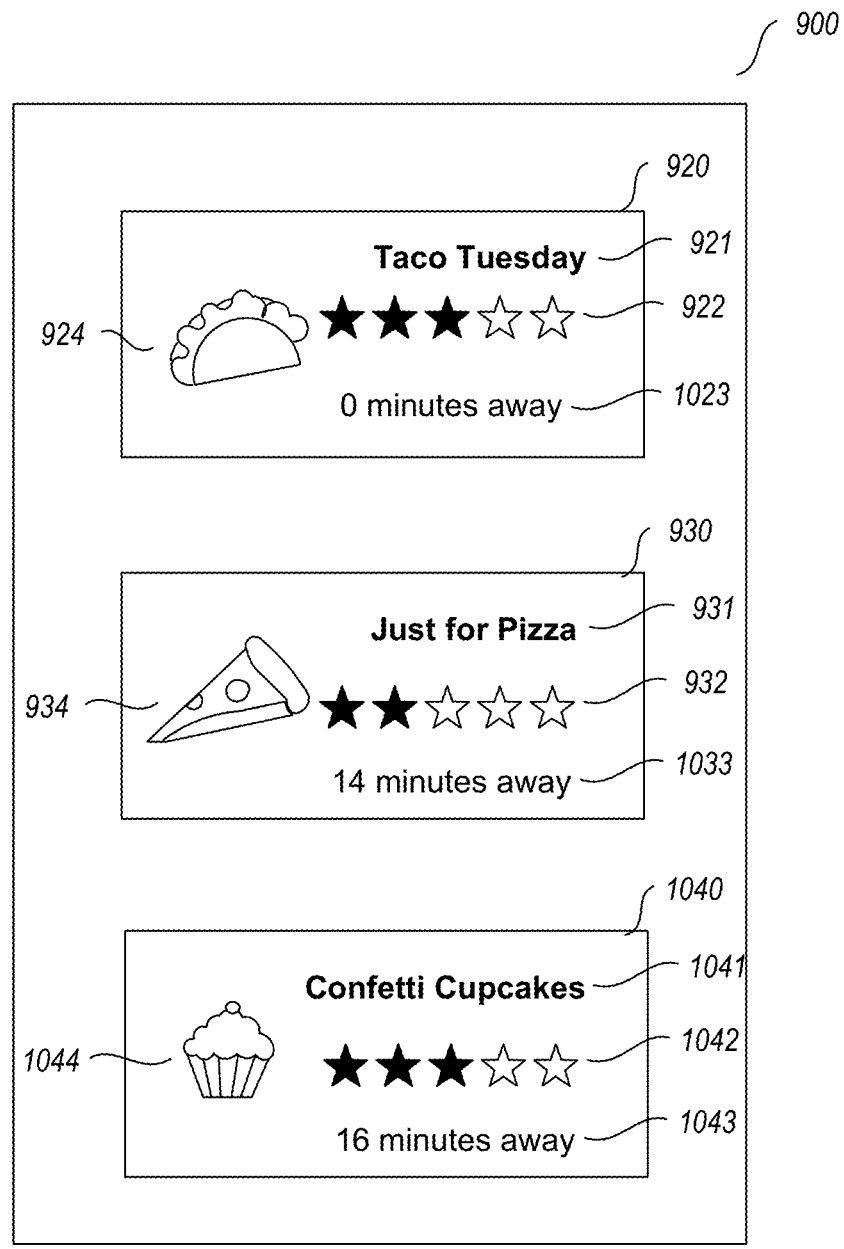
FIG. 10 is display diagram showing a display presented by the facility in some embodiments to respond to the user's scrolling of the facility's scroll list display mode.

FIG. 10 is display diagram showing a display presented by the facility in some embodiments to respond to the user's scrolling of the facility's scroll list display mode. It can be seen by comparing display 900 in FIG. 10 to display 900 in FIG. 9 that the user has scrolled the display to show an additional element 1040 that is lower on the scroll list and a greater estimated travel time 1043 from the user location at the time the scroll list was first displayed than the points of interest corresponding to the list entries that were originally displayed. As shown, scrolling the scroll list to this point has reset the user location to match the top displayed item on the scroll list, item 920 for a Taco Tuesday restaurant point of interest. The facility has accordingly re-displayed the scroll list so that entry 920 is now at the top of the scroll list and each of the items in the scroll list is included and placed in the scroll list's sort order based upon its travel time from this new user location of the Taco Tuesday restaurant. In particular, it can be seen that the expected travel time for the Just for Pizza restaurant entry 930, an estimated travel time 1033 of 14 minutes, has been adjusted by the facility from the 12 minute estimated travel time 933 shown for this point of interest in display 900 shown in FIG. 9. Any further scrolling of the scroll list will have a similar effect, and when the user next issues a switch mode command to return to act 202 and re-display the two-dimensional display will use a virtual user location corresponding to the point of interest whose scroll list item is then at the top of the scroll list.

The following is a summarization of various aspects of the embodiments described herein.

A method in a mobile device may be summarized as including: determining a user geographic location for a user of the mobile device; identifying a plurality of pieces of content each connected to a geographic location proximate to the user geographic location; initializing a display in a first display mode; while in the first display mode: adding to the display at, a user location, a visual indication of the user; for each piece of content of the identified plurality of pieces of content: determining a compass direction from the user geographic location to the geographic location to which the piece of content is connected; predicting an amount of time it would take the user to travel from the user geographic location to the geographic location to which the piece of content is connected; and adding to the display a visual indication of the piece of content at a location on the display that is in a direction from the user location relative to the determined compass direction, and is a distance from the user location that is proportional to the predicted amount of time; and receiving user input specifying a change to enter a second display mode; and while in the second display mode: selecting a number of pieces of content from the plurality of pieces of content having a shortest predicted amount of time; and replacing the display with a vertical scroll list of the selected pieces of content, the list being ordered by their predicted amount of time.

The method may include, while in the second display mode: receiving user input scrolling the displayed vertical scroll list to a new position in which a distinguished one of the selected pieces of content is displayed; choosing a plurality of pieces of content each connected to a geographic location proximate to the distinguished geographic location; for each piece of content of the chosen plurality of pieces of content: predicting the amount of time it would take for the user to travel from the geographic location to the which the distinguished piece of content is connected to the geographic location to which the chosen piece of content is connected; and replacing the display with a new vertical scroll list of the chosen pieces of content, the new vertical scroll list being ordered by their predicted amount of time.

Determining the user geographic location for the user may include determining a contemporaneous geographic location of the mobile device.

Determining the user geographic location for the user may include receiving user input specifying a geographic location to be used. Determining the user geographic location for the user may include receiving user input selecting a displayed content visual indication. Determining the user geographic location for the user may include receiving user input selecting a point on the display.

Replacing the display with the vertical scroll list may include replacing the display with the vertical scroll list of the selected pieces of content with the list being ordered based on a degree to which the user is traveling toward the geographic location to which each piece of content is connected.

Replacing the display with the vertical scroll list may include replacing the display with the vertical scroll list of the selected pieces of content with the list being ordered also based on a level of popularity attributed to a level of popularity attributed to each piece of content.

The method may include: while in the second display mode, receiving user input specifying a second change to enter the first display mode; and in response to receiving the user input, specifying the second change to enter the first display mode: entering the first display mode by repeating the adding the visual indication of the user, repeating the determining, predicting, and adding the visual indications of the pieces of content.

The method may include: for each amount of time of a plurality of different amounts of time: adding to the display in the first display mode, a ring explicitly identifying the amount of time, the ring having the user location as its center, the ring having a radius chosen such that visual indications for pieces of content for which the amount of time is predicted that is similar to the amount of time are a short distance from the ring.

The method may include: discerning a movement of the mobile device to a target geographic location; and in response to the discerning, for each piece of content of the identified plurality of pieces of content: predicting a new amount of time it would take the user to travel from the target geographic location to the geographic location to which the piece of content is connected; and shifting the location of the content visual indication for the piece of content to be at a distance from the user location that corresponds to the predicted new amount of time.

One or more memories may be summarized as collectively storing a display specification data structure with respect to a user having a user geographic location and a plurality of pieces of content, each piece of content being connected to a geographic location, the data structure comprising: information directing a mobile computing device to present a display, the display comprising: an origin point representing the user geographic location; and a plurality of content visual indications each corresponding to a different one of the pieces of content, each content visual indication being situated at a point that is (1) in a direction from the origin point that corresponds to a compass direction from the user geographic location to the geographic location to which the piece of content corresponding to the content visual indication is connected, and (2) at a distance from the origin point that corresponds to a predicted amount of time to travel from the user geographic location to the geographical location to which the piece of content corresponding to the content visual indication is connected.

For a first piece of content and a second piece of content selected from the plurality of pieces of content: the distance between the user geographic location and the geographic location to which the first piece of content is connected is greater than the distance between the user geographic location and the geographic location to which the second piece of content is connected; and the distance between the origin point and the content visual indication corresponding to the first piece of content is less than the distance between the origin point in the content visual indication corresponding to the second piece of content.

The display may include a plurality of concentric rings all having the origin point as their center, each explicitly identifying an amount of time it is predicted to take to travel from the user geographic location to geographic locations to which pieces of content corresponding to content visual indications near the ring are connected.

The display that the information directing a mobile computing device contained by the data structure stored by the memories may include a user visual indication at the origin point.

The display that the information directing a mobile computing device contained by the data structure stored by the memories may indicate an aspect of movement performed by the user.

The display that the information directing a mobile computing device contained by the data structure stored by the memories may include a user visual indication at the origin point that indicates a mode of movement inferred for the user, a speed of movement measured for the user, and/or a direction of movement determined for the user.

One or more instances of computer-readable media may be summarized as collectively having contents configured to cause a mobile computing system to perform a method, the method comprising: determining a geographic location for a user; and causing to be displayed a vertical scroll list of geographic points of interest each within a threshold distance of the user geographic location, the points of interest being ordered in the list based upon at least an estimated amount of time for the user to travel from the user geographic location to each of the points of interest.

The method that the contents of the computer-readable media are configured to cause a mobile computing system to perform may include: receiving user input scrolling the vertical scroll list to a position in which a distinguished point of interest is displayed; and in response to receiving the user input, causing to be displayed a new vertical scroll list of geographic points of interest, the points of interest being ordered in the new vertical scroll list based at least upon at least an estimated amount of time for the user to travel from the geographic location of the distinguished point of interest to each of the points of interest in the new vertical scroll list.

The points of interest may be ordered based also on: a degree to which the user is traveling toward the geographic location to which each piece of content is connected, and/or a level of popularity attributed to each piece of content.

The user geographic location may be determined by determining a contemporaneous geographic location of the mobile computing system.

The user geographic location may be determined in response to user input specifying a particular geographic location.

The user input may specify a particular geographic location is user input selecting a point of interest in the list in order to specify the geographic location of the selected point of interest.

The one or more instances of computer-readable media may include: receiving user input specifying a change in display modes; and in response to receiving the user input while the vertical scroll list is displayed, presenting a display in which points of interest are plotted in two-dimensional space relative to a user display location, each point of interest being plotted in a position that is: in a direction from the user display location that corresponds to a compass direction from the user location to the geographic location of the point of interest, and a distance from the user location that is based on a predicted amount of time to travel from the user location to the geographic location of the point of interest.

The one or more instances of computer-readable media may include: receiving user input scrolling the scroll list to a selected point of interest; and in response to receiving the user input specifying a change in display modes, choosing points of interest to be plotted by comparing (1) a predicted amount of time to travel from the user location to the geographic location of each point of interest to (2) a predicted amount of time to travel from the user location to the geographic location of the selected point of interest.

One or more memories collectively storing a display specification data structure with respect to a user having a user geographic location and a plurality of pieces of content, each piece of content being connected to a geographic location, the data structure may include: information directing a mobile computing device to present a display, the display comprising a vertically-oriented list of pieces of content among the plurality of pieces of content, the list being ordered in increasing order of a predicted amount of time to travel from the user geographic location to the geographical location to which each piece of content among the plurality of pieces of content is connected.

The data structure stored by the memories may include: information directing the mobile computing device to present a second display, the second display comprising a vertically-oriented list of geographic pieces of content, the new vertically-oriented list being ordered in increasing order of a predicted amount of time to travel from the geographic location to which the distinguished pieces of content is connected to the geographical location to which each piece of content among the plurality of pieces of content is connected.

The points of interest may be ordered based on: a degree to which the user is traveling toward the geographic location to which each piece of content is connected, and/or a level of popularity attributed to a level of popularity attributed to each piece of content.

The various embodiments described above can be combined to provide further embodiments. Aspects of the embodiments can be modified, if necessary to employ concepts of the various patents, applications and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
   a memory configured to store computer instructions; and
   a processor configured to execute the computer instructions to:
      determine a user geographic location for a user of a mobile device;
      determine a travel mode of the user based on movement of the mobile device;
      identify a plurality of pieces of content each connected to a geographic location proximate to the user geographic location based on the travel mode;
      initialize a display in a first display mode;
      while in the first display mode:
         add to the display at, a user location, a visual indication of the user and the travel mode;
         dynamically add to the display, a plurality of rings based on the travel mode, wherein each separate ring of the plurality of rings identifies a separate amount of time to travel from the user geographic location based on the travel mode, with each separate ring having a radius that corresponds to the separate amount of time;
         for each piece of content of the identified plurality of pieces of content:
            determine a compass direction from the user geographic location to the geographic location to which the piece of content is connected;
            predict, based on the travel mode, an amount of time it would take the user to travel from the user geographic location to the geographic location to which the piece of content is connected; and
            add to the display a visual indication of the piece of content at a location on the display that is in a direction from the user location relative to the determined compass direction, and is a distance from the user location that is proportional to the predicted amount of time; and
         receive user input specifying a change to enter a second display mode; and
      while in the second display mode:
         select a number of pieces of content from the plurality of pieces of content having a shortest predicted amount of time; and
         replace the display with a vertical scroll list of the selected pieces of content, the list being ordered by their predicted amount of time.

2. The system of claim 1, wherein the processor is configured to further execute the computer instructions to:
   while in the second display mode:
      receive user input scrolling the displayed vertical scroll list to a new position in which a distinguished one of the selected pieces of content is displayed;
      choose a plurality of pieces of content each connected to a geographic location proximate to the distinguished geographic location;
      for each piece of content of the chosen plurality of pieces of content:
         predict the amount of time it would take for the user to travel from the geographic location to the which the distinguished piece of content is connected to the geographic location to which the chosen piece of content is connected; and
      replace the display with a new vertical scroll list of the chosen pieces of content, the new vertical scroll list being ordered by their predicted amount of time.

3. The system of claim 1 wherein the processor determines the user geographic location for the user by further executing the computer instructions to:
   determine a contemporaneous geographic location of the mobile device.

4. The system of claim 1 wherein the processor determines the user geographic location for the user by further executing the computer instructions to:
   receive user input specifying a geographic location to be used.

5. The system of claim 4 wherein the processor determines the user geographic location for the user by further executing the computer instructions to:
   receive user input selecting a displayed content visual indication.

6. The system of claim 1 wherein the processor replaces the display with the vertical scroll list by further executing the computer instructions to:
   replace the display with the vertical scroll list of the selected pieces of content with the list being ordered based on a degree to which the user is traveling toward the geographic location to which each piece of content is connected.

7. The system of claim 1 wherein the processor replaces the display with the vertical scroll list by further executing the computer instructions to:
   replace the display with the vertical scroll list of the selected pieces of content with the list being ordered based on a level of popularity attributed to a level of popularity attributed to each piece of content.

8. The system of claim 1, wherein the processor is configured to further execute the computer instructions to:
   while in the second display mode, receive user input specifying a second change to enter the first display mode; and
   in response to receiving the user input specifying the second change to enter the first display mode:
      enter the first display mode by repeating the adding the visual indication of the user, repeating the determining, predicting, and adding the visual indications of the pieces of content.

9. The system of claim 1, wherein the processor is configured to further execute the computer instructions to:
   for each amount of time of a plurality of different amounts of time:
      add to the display in the first display mode, a ring explicitly identifying the amount of time, the ring having the user location as its center, the ring having a radius chosen such that visual indications for pieces of content for which the amount of time is predicted that is similar to the amount of time are a short distance from the ring.

10. The system of claim 1, wherein the processor is configured to further execute the computer instructions to:
discern a movement of the mobile device to a target geographic location; and
in response to the discerning, for each piece of content of the identified plurality of pieces of content:
predict a new amount of time it would take the user to travel from the target geographic location to the geographic location to which the piece of content is connected; and
shift the location of the content visual indication for the piece of content to be at a distance from the user location that corresponds to the predicted new amount of time.

11. A non-transitory computer-readable medium storing computer instructions that, when executed by at least one processor, cause the at least one processor to perform actions, the actions comprising:
determining a user geographic location for a user of the mobile device;
determining a travel mode of the user based on movement of the mobile device;
determining an effective time range for the user;
identifying a plurality of pieces of content each connected to a geographic location proximate to the user geographic location based on the travel mode;
initializing a display in a first display mode;
while in the first display mode:
adding to the display at, a user location, a visual indication of the user and the travel mode;
dynamically adding to the display, a plurality of rings based on the travel mode, wherein each separate ring of the plurality of rings identifies a separate amount of time to travel from the user geographic location based on the travel mode, with each separate ring having a radius that corresponds to the separate amount of time;
for each piece of content of the identified plurality of pieces of content:
determining a compass direction from the user geographic location to the geographic location to which the piece of content is connected;
predicting, based on the travel mode, an amount of time it would take the user to travel from the user geographic location to the geographic location to which the piece of content is connected;
determining if the piece of content has a time that is within the effective time range for the user relative to the predicted amount of time it would take the user to travel from the user geographic location to the geographic location to which the piece of content is connected; and
in response to the piece of content having a time that is within the effective time range for the user relative to the predicted amount of time, adding to the display a visual indication of the piece of content at a location on the display that is in a direction from the user location relative to the determined compass direction, and is a distance from the user location that is proportional to the predicted amount of time; and
receiving user input specifying a change to enter a second display mode; and
while in the second display mode:
selecting a number of pieces of content from the plurality of pieces of content having a shortest predicted amount of time and a time that is within the effective time range for the user relative to the predicted amount of time; and
replacing the display with a vertical scroll list of the selected pieces of content, the list being ordered by their predicted amount of time.

12. A method, comprising:
determining, by a computing device, a user geographic location for a user of a mobile device;
determining, by the computing device, a travel mode of the user based on movement of the mobile device;
identifying, by the computing device, a plurality of pieces of content each connected to a geographic location proximate to the user geographic location based on the travel mode;
initializing, by the computing device, a display in a first display mode;
while in the first display mode:
adding, by the computing device, to the display at, a user location, a visual indication of the user and the travel mode;
dynamically adding, by the computing device, to the display, a plurality of rings based on the travel mode, wherein each separate ring of the plurality of rings identifies a separate amount of time to travel from the user geographic location based on the travel mode, with each separate ring having a radius that corresponds to the separate amount of time;
for each piece of content of the identified plurality of pieces of content:
determining, by the computing device, a compass direction from the user geographic location to the geographic location to which the piece of content is connected;
predicting, by the computing device and based on the travel mode, an amount of time it would take the user to travel from the user geographic location to the geographic location to which the piece of content is connected; and
adding, by the computing device, to the display a visual indication of the piece of content at a location on the display that is in a direction from the user location relative to the determined compass direction, and is a distance from the user location that is proportional to the predicted amount of time; and
receiving, by the computing device, user input specifying a change to enter a second display mode; and
while in the second display mode:
selecting, by the computing device, a number of pieces of content from the plurality of pieces of content having a shortest predicted amount of time; and
replacing, by the computing device, the display with a vertical scroll list of the selected pieces of content, the list being ordered by their predicted amount of time.

13. The method of claim 12, further comprising while in the second display mode:
receiving, by the computing device, user input scrolling the displayed vertical scroll list to a new position in which a distinguished one of the selected pieces of content is displayed;
choosing, by the computing device, a plurality of pieces of content each connected to a geographic location proximate to the distinguished geographic location;

for each piece of content of the chosen plurality of pieces of content:
predicting, by the computing device, the amount of time it would take for the user to travel from the geographic location to the which the distinguished piece of content is connected to the geographic location to which the chosen piece of content is connected; and
replacing, by the computing device, the display with a new vertical scroll list of the chosen pieces of content, the new vertical scroll list being ordered by their predicted amount of time.

14. The method of claim 12, wherein determining the user geographic location for the user further comprises:
determining, by the computing device, a contemporaneous geographic location of the mobile device.

15. The method of claim 12, wherein determining the user geographic location for the user further comprises:
receiving, by the computing device, user input specifying a geographic location to be used.

16. The method of claim 15, wherein determining the user geographic location for the user further comprises:
receiving, by the computing device, user input selecting a displayed content visual indication.

17. The method of claim 12, wherein replacing the display with the vertical scroll list further comprises:
replacing, by the computing device, the display with the vertical scroll list of the selected pieces of content with the list being ordered based on a degree to which the user is traveling toward the geographic location to which each piece of content is connected.

18. The method of claim 12, wherein replacing the display with the vertical scroll list further comprises:
replacing, by the computing device, the display with the vertical scroll list of the selected pieces of content with the list being ordered based on a level of popularity attributed to a level of popularity attributed to each piece of content.

19. The method of claim 12, further comprising:
while in the second display mode, receiving, by the computing device, user input specifying a second change to enter the first display mode; and
in response to receiving the user input specifying the second change to enter the first display mode:
entering, by the computing device, the first display mode by repeating the adding the visual indication of the user, repeating the determining, predicting, and adding the visual indications of the pieces of content.

20. The method of claim 12, further comprising:
for each amount of time of a plurality of different amounts of time:
adding, by the computing device, to the display in the first display mode, a ring explicitly identifying the amount of time, the ring having the user location as its center, the ring having a radius chosen such that visual indications for pieces of content for which the amount of time is predicted that is similar to the amount of time are a short distance from the ring.

21. The method of claim 12, further comprising:
discerning, by the computing device, a movement of the mobile device to a target geographic location; and
in response to the discerning, for each piece of content of the identified plurality of pieces of content:
predicting, by the computing device, a new amount of time it would take the user to travel from the target geographic location to the geographic location to which the piece of content is connected; and
shifting, by the computing device, the location of the content visual indication for the piece of content to be at a distance from the user location that corresponds to the predicted new amount of time.

* * * * *